G. E. BAKER.
TRACTION DEVICE.
APPLICATION FILED APR. 23, 1910.

1,003,025.

Patented Sept. 12, 1911.

Witnesses

George E. Baker,
Inventor by C. A. Snow & Co.
Attorneys

UNITED STATES PATENT OFFICE.

GEORGE ELIAS BAKER, OF REED CITY, MICHIGAN.

TRACTION DEVICE.

1,003,025.  Specification of Letters Patent.  Patented Sept. 12, 1911.

Application filed April 23, 1910. Serial No. 557,270.

*To all whom it may concern:*

Be it known that I, GEORGE E. BAKER, a citizen of the United States, residing at Reed City, in the county of Osceola and State of Michigan, have invented a new and useful Traction Device, of which the following is a specification.

This invention relates to a traction device and it consists in the novel construction and arrangement of its parts as hereinafter shown and described.

The object of the invention is to provide in a traction device an endless tread composed of a series of links of peculiar configurations and having their parts so disposed as to effectually withstand the strains to which they are subjected. An ovate frame is provided at its edges with spaced tracks, a friction reducing chain is arranged to move along said tracks and is provided with disks of peculiar configuration which space said chain from the tracks and have peripheral portions adapted to travel upon the tracks. The tread is in close contact with the said chain at the forward and under portion of the frame and fender plates are mounted upon the frame and are adapted to prevent the accumulation of dirt or other objectionable material between the parts of the traction device.

Figure 1:
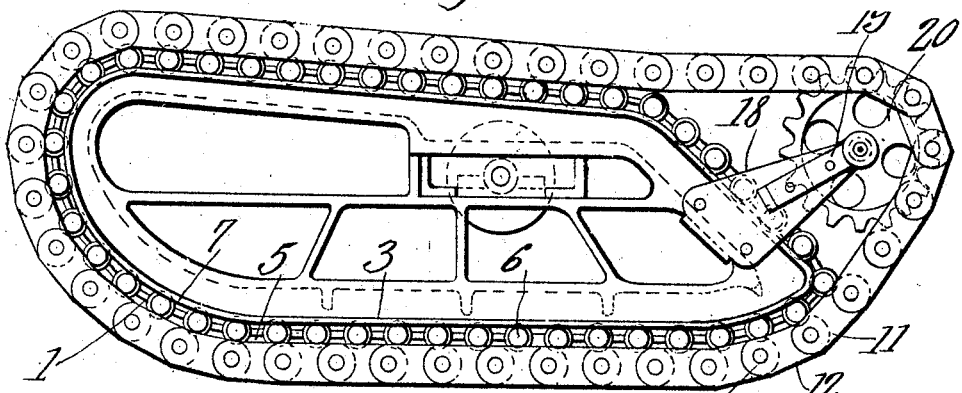
Figure 2:
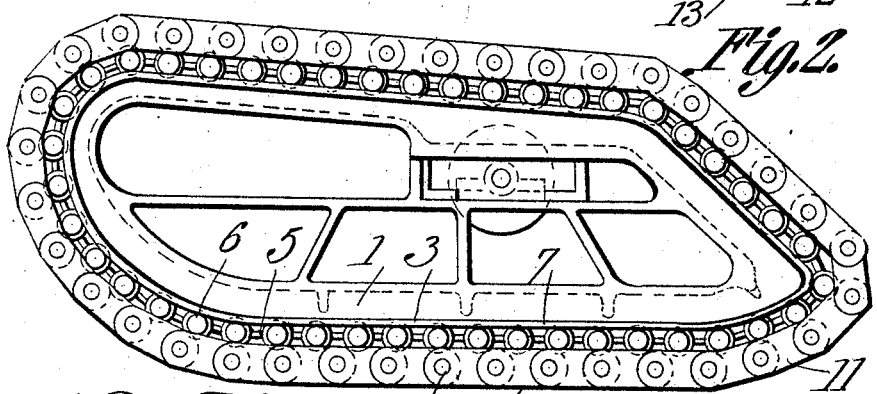
Figure 3:
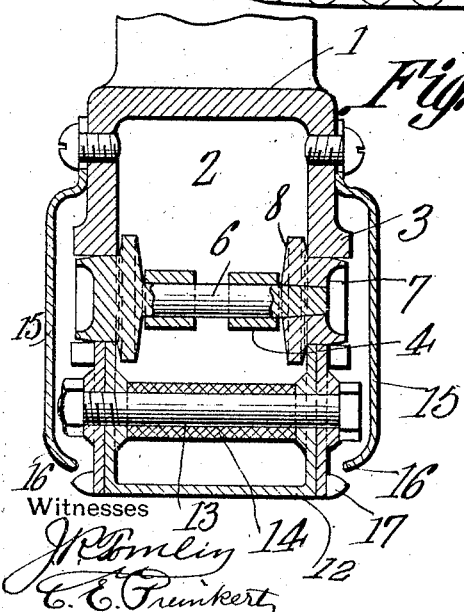
Figure 4:
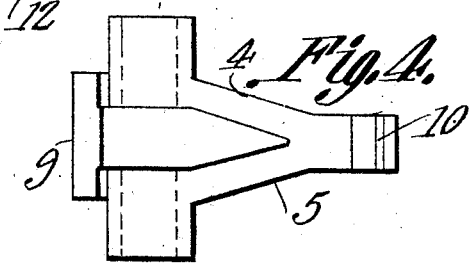
Figure 5:
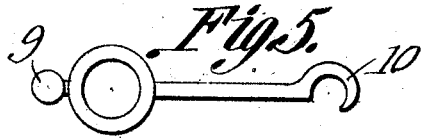

In the accompanying drawings:—Figure 1 is a side elevation of a portion of the traction device when power is employed to operate the same. Fig. 2 is a side elevation of a modified form of the traction device adapted to be used when draft means other than power is employed. Fig. 3 is an enlarged transverse sectional view of a portion of the device. Fig. 4 is a plan view of a link used in the device. Fig. 5 is an edge view of said link.

The frame 1 of the device is provided at its periphery with a continuous groove 2 having at its opposite sides spaced tracks 3. An endless chain 4 is arranged to move about the periphery of the frame 1 and consists of links 5 in which are journaled bolts 6. Disks 7 are located at the ends of the bolts 6 and are provided with flanges 8 which are interposed between the edges of the links and the sides of the tracks 3. The disks 7 are adapted to travel upon the surfaces of the tracks 3. Each link of the chain 4 is provided at one end with a cross bar 9 and at its other end with a hook 10 and the hook of one link is adapted to engage the cross bar of the next adjacent link and this means of connection is continuous throughout the said chain.

A chain 11 of tread members 12 is arranged to move in close contact with the chain 4 at the forward and under portion of the frame 1. The members 12 are U-shaped in end elevation and are pivotally connected together by bolts 13. Sleeves 14 are mounted upon the intermediate portions of the bolts 13 and have their ends in close contact with the inner sides of the innermost portions of the members 12, as illustrated in Fig. 3 of the drawings. During the time that the chain 11 is in contact with the chain 4 the outer portions of the disk 7 lie between the tracks 3 and the inner edges of the bridge members 12 of the chain 11.

In the form of the invention as illustrated in Fig. 2 it will be seen that the tread 11 fits snugly about the disk 7 throughout the entire length of the chain 4, while in the form of the invention as illustrated in Fig. 1 of the drawings, the upper rear portion of the said tread is spaced from the adjacent disk 7. Fender plates 15 are attached to the sides of the frame 1 and are provided at their edges with inturned flanges 16 which terminate adjacent the flanges 17 provided at the outer portions of the bridge members 12 of the chain 11. The said plates 15 serve as means for preventing dirt and other foreign material from entering between the parts of the traction devices.

In the form of the device as shown in Fig. 1 of the drawings a block 18 is mounted upon the frame 1 and arms 19 are mounted upon the said block. A sprocket wheel 20 is journaled between the arms 19 and is adapted to engage the cross bolts or sleeves 14 upon the cross bolts 13 of the tread 11. This form of device is adapted to be used when power is employed for driving the sprocket wheel 20 and it is apparent that as the said wheel 20 rotates the tread 11 will be carried about the periphery of the frame 1 and in contact with the upper forward and lower portion of the chain 4 and the disks 7 carried thereby. Thus it will be seen that a single traction device is provided and as the tread 11 passes about the periphery of the frame the disks 7 and their flanges 8 are interposed between the tracks carried by the frame and the chain 4, and between the said tracks and the members constituting the tread 11. Therefore it will be seen that friction is reduced to a minimum.

Having described the invention what I claim as new and desire to secure by Letters Patent is:—

A traction device comprising a frame having a track at its periphery, a chain of links surrounding the periphery of the frame, each link of said chain having at one end a bar and at its other end a hook, the hooks of the links throughout the chain pivotally receiving the bars of the adjacent links, the links having at points between their bars and hooks bearings, bolts journaled in said bearings, flanged disks located at the ends of said bolts and arranged to travel upon the track of the frame, and a chain of tread members arranged to move about said disks.

In testimony that I claim the foregoing as my own, I have hereto affixed my signature in the presence of two witnesses.

GEORGE ELIAS BAKER.

Witnesses:
L. G. HAMMOND,
J. N. PARKHURST.